United States Patent
Okada

(10) Patent No.: US 10,582,122 B2
(45) Date of Patent: Mar. 3, 2020

(54) IMAGE PROCESSING APPARATUS, IMAGE PROCESSING METHOD, AND IMAGE PICKUP APPARATUS

(71) Applicant: Sony Corporation, Tokyo (JP)

(72) Inventor: Motoshige Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/757,987

(22) PCT Filed: Jun. 1, 2017

(86) PCT No.: PCT/JP2017/020393
§ 371 (c)(1),
(2) Date: Mar. 7, 2018

(87) PCT Pub. No.: WO2017/217238
PCT Pub. Date: Dec. 21, 2017

(65) Prior Publication Data
US 2018/0241941 A1  Aug. 23, 2018

(30) Foreign Application Priority Data

Jun. 15, 2016 (JP) ................................ 2016-118575

(51) Int. Cl.
*H04N 5/232* (2006.01)
*G02B 7/32* (2006.01)
(Continued)

(52) U.S. Cl.
CPC ......... *H04N 5/23232* (2013.01); *G01S 17/10* (2013.01); *G01S 17/36* (2013.01);
(Continued)

(58) Field of Classification Search
CPC ............. H04N 5/23232; H04N 5/2258; H04N 5/23293; G01S 17/10; G01S 17/36;
(Continued)

(56) References Cited

U.S. PATENT DOCUMENTS

| 2002/0030833 | A1 | 3/2002 | Kuwata et al. | |
|---|---|---|---|---|
| 2011/0080497 | A1* | 4/2011 | Ejima | H04N 5/23216 348/222.1 |
| 2012/0195580 | A1* | 8/2012 | Itoh | G01C 3/08 396/111 |

FOREIGN PATENT DOCUMENTS

| JP | 2002-344881 A | 11/2002 |
|---|---|---|
| JP | 2010-268307 A | 11/2010 |

(Continued)

OTHER PUBLICATIONS

International Search Report and English translation thereof dated Aug. 15, 2017 in connection with International Application No. PCT/JP2017/020393.

*Primary Examiner* — Ahmed A Berhan
*Assistant Examiner* — Fayez Bhuiyan
(74) *Attorney, Agent, or Firm* — Wolf, Greenfield & Sacks, P.C.

(57) ABSTRACT

The present technology relates to an image processing apparatus, an image processing method, and an image pickup apparatus that enable image data to be compressed using distance information.

An image processing apparatus includes an image processing unit that divides an image area of a predetermined image into at least two areas on the basis of distance information obtained by a distance measurement sensor, and executes image processing on at least one of the two areas of the image such that image qualities of the two areas differ. The present technology is applicable to, for example, an image pickup apparatus and the like.

13 Claims, 14 Drawing Sheets

(51) Int. Cl.
  *G01S 17/88*  (2006.01)
  *G01S 17/89*  (2020.01)
  *H04N 5/225*  (2006.01)
  *G01S 17/36*  (2006.01)
  *G06T 5/00*  (2006.01)
  *G01S 17/10*  (2020.01)

(52) U.S. Cl.
  CPC .............. *G01S 17/88* (2013.01); *G01S 17/89* (2013.01); *G02B 7/32* (2013.01); *G06T 5/008* (2013.01); *H04N 5/2258* (2013.01); *H04N 5/23293* (2013.01); *G06T 2207/10024* (2013.01); *G06T 2207/10028* (2013.01); *G06T 2207/20012* (2013.01)

(58) Field of Classification Search
  CPC G01S 17/88; G01S 17/89; G02B 7/32; G06T 5/50
  See application file for complete search history.

(56) References Cited

FOREIGN PATENT DOCUMENTS

| | | |
|---|---|---|
| JP | 2012-004623 A | 1/2012 |
| JP | 2014-138290 A | 7/2014 |

\* cited by examiner

Example of case of converting resolution

| | frame1 | frame2 | frame3 | frame4 | frame5 | frame6 | frame7 | frame8 |
|---|---|---|---|---|---|---|---|---|
| Second image (60FPS FHD) 92 | 92-1 | 92-2 | 92-3 | 92-4 | 92-5 | 92-6 | 92-7 | 92-8 |
| Frame synthesis information | 01-2-2 | 02-2-2 | 03-2-2 | 04-2-2 | 05-2-2 | 06-2-2 | 07-2-2 | 08-2-2 |
| First image (60FPS 4K) 91 | 91-1 | 91-2 | 91-3 | 91-4 | 91-5 | 91-6 | 91-7 | 91-8 |
| Frame synthesis information | 01-2-1 | 02-2-1 | 03-2-1 | 04-2-1 | 05-2-1 | 06-2-1 | 07-2-1 | 08-2-1 |
| Synthetic image (60FPS 4K+FHD) 93 | 93-1 | 93-2 | 93-3 | 93-4 | 93-5 | 93-6 | 93-7 | 93-8 |

Frame synthesis information:
frame identification number + division number + subframe identification number

IMAGE PROCESSING APPARATUS, IMAGE PROCESSING METHOD, AND IMAGE PICKUP APPARATUS

CROSS-REFERENCE TO RELATED APPLICATIONS

This application claims the benefit under 35 U.S.C. § 371 as a U.S. National Stage Entry of International Application No. PCT/JP2017/020393, filed in the Japanese Patent Office as a Receiving Office on Jun. 1, 2017, which claims priority to Japanese Patent Application Number JP 2016-118575, filed in the Japanese Patent Office on Jun. 15, 2016, each of which is hereby incorporated by reference in its entirety.

TECHNICAL FIELD

The present technology relates to an image processing apparatus, an image processing method, and an image pickup apparatus, more particularly, to an image processing apparatus, an image processing method, and an image pickup apparatus that enable image data to be compressed using distance information.

BACKGROUND ART

In transferring moving images, a data amount to be transferred becomes larger as a resolution or frame rate of a moving image becomes higher, and in a case where a sufficient communication band cannot be secured, a frame drop occurs. In order to prevent the frame drop, it is necessary to lower the resolution, lower the frame rate, or the like.

Some image pickup apparatuses such as a digital still camera and a digital video camera include a distance measurement sensor that measures a distance to a subject using, for example, a ToF system (see, for example, Patent Literature 1).

CITATION LIST

Patent Literature

Patent Literature 1: Japanese Patent Application Laid-open No. 2014-138290

DISCLOSURE OF INVENTION

Technical Problem

Patent Literature 1 proposes to perform blur removal processing on a captured image using distance information with respect to a subject obtained by a distance measurement sensor, but does not disclose a technology for compressing image data using the distance information.

The present technology has been made in view of the circumstances as described above and aims at enabling image data to be compressed using distance information.

Solution to Problem

An image processing apparatus according to a first aspect of the present technology includes an image processing unit that divides an image area of a predetermined image into at least two areas on the basis of distance information obtained by a distance measurement sensor, and executes image processing on at least one of the two areas of the image such that image qualities of the two areas differ.

An image processing method according to a second aspect of the present technology, that is executed by an image processing apparatus, includes dividing an image area of a predetermined image into at least two areas on the basis of distance information obtained by a distance measurement sensor, and executing image processing on at least one of the two areas of the image such that image qualities of the two areas differ.

In the first and second aspects of the present technology, the image area of the predetermined image is divided into at least two areas on the basis of the distance information obtained by the distance measurement sensor, and the image processing is executed on at least one of the two areas of the image such that the image qualities of the two areas differ.

An image pickup apparatus according to a third aspect of the present technology includes: an image pickup sensor that captures an image of a subject; a distance measurement sensor that acquires distance information with respect to the subject; and an image processing unit that divides an image area of an image obtained by the image pickup sensor into at least two areas on the basis of the distance information obtained by the distance measurement sensor, and executes image processing on at least one of the two areas of the image such that image qualities of the two areas differ.

In the third aspect of the present technology, the image area of the image obtained by the image pickup sensor is divided into at least two areas on the basis of the distance information obtained by the distance measurement sensor, and the image processing is executed on at least one of the two areas of the image such that the image qualities of the two areas differ.

The image processing apparatus and the image pickup apparatus may be independent apparatuses or may be internal blocks configuring a single apparatus.

Advantageous Effects of Invention

According to the first to third aspects of the present technology, it becomes possible to compress image data using distance information.

It should be noted that the effects described herein are not necessarily limited, and any effect described in the present disclosure may be obtained.

BRIEF DESCRIPTION OF DRAWINGS

FIG. 5 A diagram that explains synthesis processing for synthesizing a first image and a second image after the resolution conversion processing.

FIG. 7 A diagram showing an example of a case where a black image is inserted on a low frame rate side.

MODES FOR CARRYING OUT THE INVENTION

Figure 1:
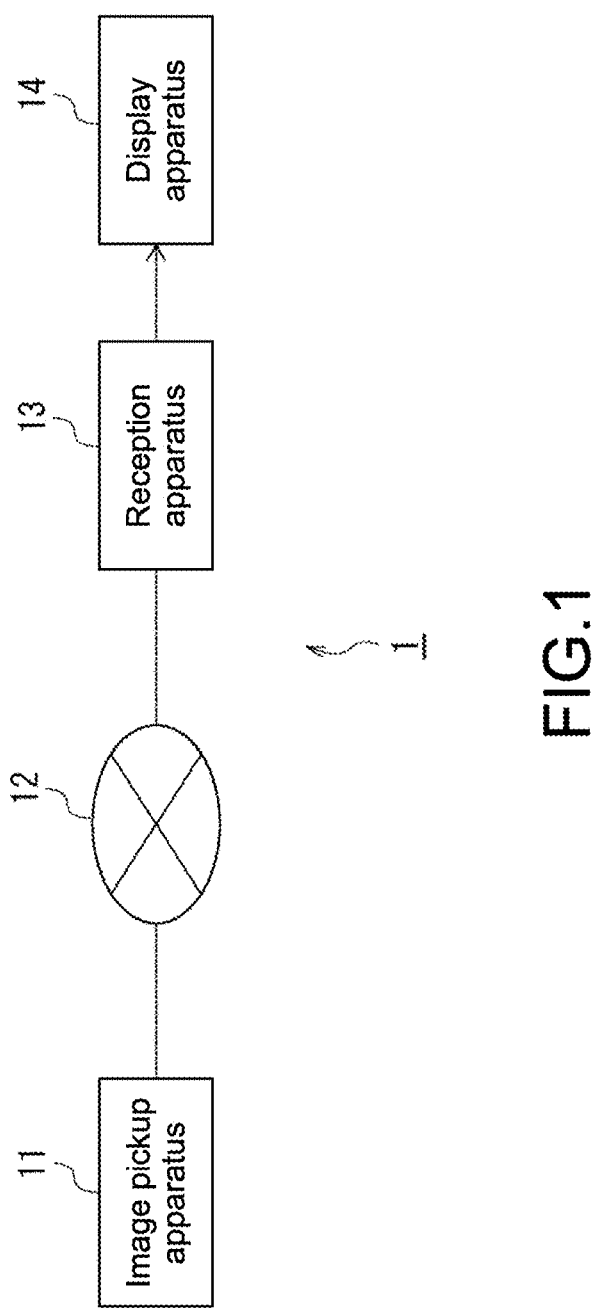
FIG. 1 A block diagram showing a configuration example of an image processing system to which the present technology is applied.

Hereinafter, a configuration for embodying the present technology (hereinafter, referred to as embodiment) will be described. It should be noted that descriptions will be given in the following order.
1. System configuration example
2. First configuration example of image pickup apparatus
3. Second configuration example of image pickup apparatus
4. Explanation of image processing
5. Explanation using flowcharts
6. Conclusion
7. Explanation of computer to which present technology is applied

1. System Configuration Example

FIG. 1 is a block diagram showing a configuration example of an image processing system to which the present technology is applied.

An image processing system 1 shown in FIG. 1 includes an image pickup apparatus 11, a reception apparatus 13, and a display apparatus 14, and the image pickup apparatus 11 and the reception apparatus 13 are connected via a network 12.

For example, the image pickup apparatus 11 is constituted of a single-lens reflex digital camera, a mirrorless digital camera, an interchangeable lens digital camera, a compact digital camera, a digital video camera, and the like, captures an image of a subject, and generates an image as a result. Further, the image pickup apparatus 11 may be a consumer camera, a broadcast camera, or a surveillance camera. Furthermore, the image pickup apparatus 11 may be an electronic apparatus such as a mobile apparatus, a game apparatus, and a smartphone including an image pickup function as a part of its functions.

The image pickup apparatus 11 executes, on a captured image, predetermined image processing for reducing a data amount to be transmitted, and transmits the image that has been subjected to the image processing to the reception apparatus 13 via the network 12. The network 12 is constituted of, for example, the Internet, a telephone network, a satellite communication network, a LAN (Local Area Network), a WAN (Wide Area Network), and the like.

The reception apparatus 13 receives the image transmitted from the image pickup apparatus 11 via the network 12 and outputs the received image to the display apparatus 14 for display. In addition, the reception apparatus 13 executes predetermined image processing such as synthesis processing for synthesizing a plurality of received images on the basis of additional information added to the transmitted image, and transmits the processed image to the display apparatus 14 for display.

2. First Configuration Example of Image Pickup Apparatus

Figure 2:
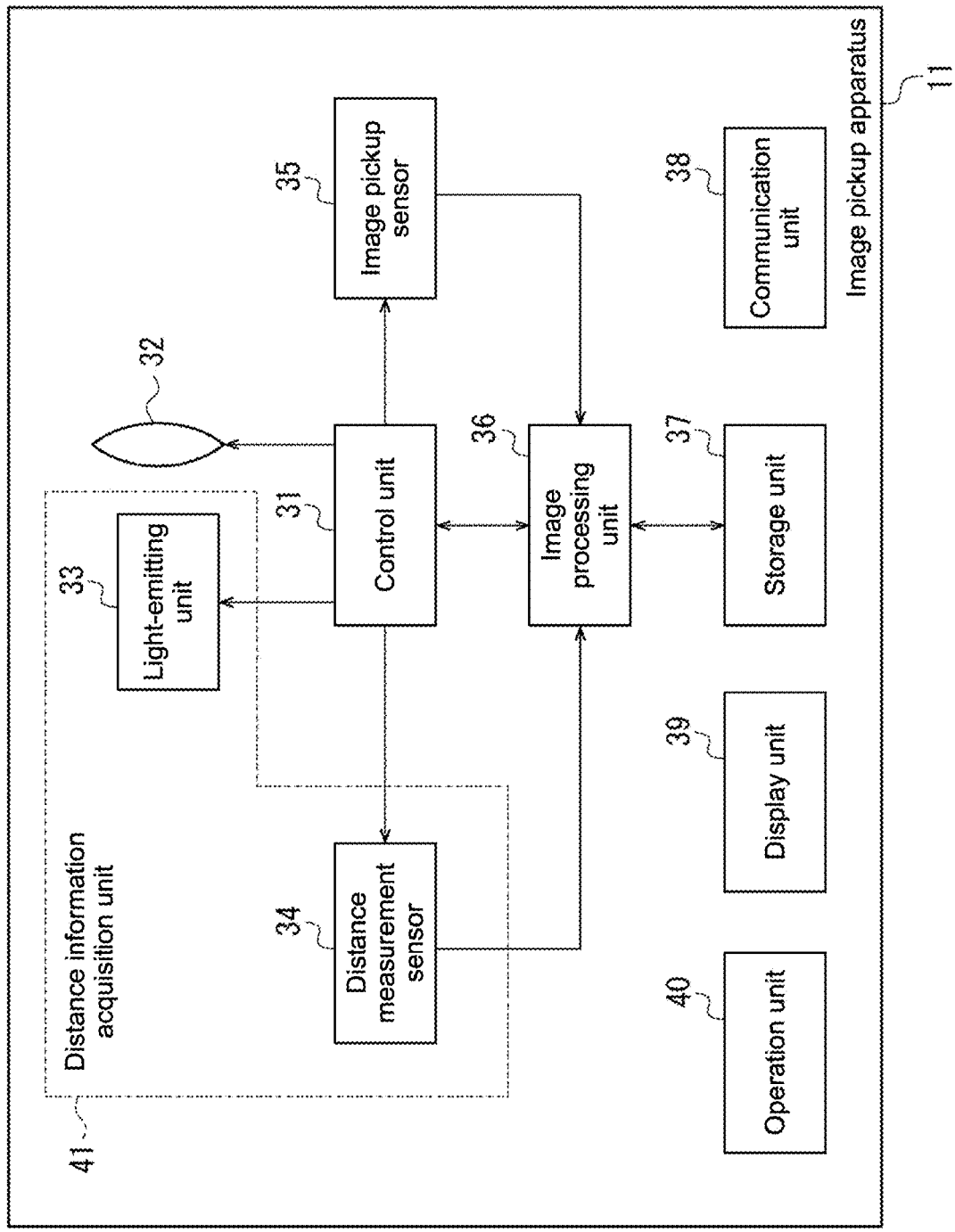
FIG. 2 A block diagram showing a first configuration example of an image pickup apparatus.

FIG. 2 is a block diagram showing a first configuration example of the image pickup apparatus 11.

The image pickup apparatus 1 includes a control unit 31, an optical system 32, a light-emitting unit 33, a distance measurement sensor 34, an image pickup sensor 35, an image processing unit 36, a storage unit 37, a communication unit 38, a display unit 39, and an operation unit 40.

The control unit 31 includes, for example, an arithmetic processing unit such as a CPU (Central Processing Unit) and an MPU (Micro Processing Unit), peripheral circuits, and the like, and reads out and executes a predetermined control program recorded in the storage unit 37, to thus control overall operations of the image pickup apparatus 11.

For example, the control unit 31 controls lens positions of various lenses configuring the optical system 32, such as a focus lens, a zoom lens, and a camera shake correction lens, and controls on/off of light emission by the light-emitting unit 33. Alternatively, the control unit 31 controls image pickup operations of the image pickup sensor 35 and the distance measurement sensor 34 and causes the image processing unit 36 to execute predetermined image processing.

The optical system 32 is constituted of various lenses such as a focus lens, a zoom lens, and a camera shake correction lens, for example, and is moved to a predetermined position under control of the control unit 31.

The light-emitting unit 33 includes, for example, an LED (Light Emitting Diode) light source that emits IR light (infrared light), and turns on/off emission of IR light under control of the control unit 31. The light-emitting unit 33 is capable of emitting IR light by a predetermined light-emitting pattern (on/off repeating pattern).

The distance measurement sensor 34 functions as a light reception unit that receives the IR light emitted from the light-emitting unit 33 and measures a distance to a subject using a ToF (Time of Flight) system, for example. In the ToF system, an elapsed time up to when IR light emitted from the light-emitting unit 33 is reflected back by a surface of the subject is measured, and the distance to the subject is measured on the basis of the elapsed time. The distance measurement sensor 34 that uses the ToF system is capable of generating distance information at high speed (in short cycle) and is also capable of generating distance information even at a dark place irrespective of peripheral brightness since it uses IR light.

For example, the distance measurement sensor 34 is constituted of an image pickup device (image sensor) in which respective pixels forming a photodiode are arranged two-dimensionally, and by measuring the elapsed time before IR light is received for each pixel, a distance of not only one point of a subject but also various parts can be measured. As a method of measuring the elapsed time described above, there are a method of pulse-irradiating IR light and directly measuring a time before the light is reflected back by a surface of a subject, a method of modulating IR light and calculating on the basis of a phase difference between a phase of light during irradiation and a phase of light that has been reflected back, and the like.

The distance information measured by the distance measurement sensor 34 is supplied to the image processing unit 36.

The light-emitting unit 33 and the distance measurement sensor 34 constitute a distance information acquisition unit 41 that acquires distance information with respect to a subject included in an image captured by the image pickup sensor 35. It should be noted that a method of acquiring distance information with respect to a subject, that is carried out by the distance information acquisition unit 41, is not limited to the ToF system. For example, distance information with respect to a subject may be acquired using a structure light method or the like. The structure light method is a method of estimating a distance to an object by projecting a light pattern of a special design onto a surface of the object and analyzing a deformation of the projected pattern.

Further, it is also possible to generate an IR image on the basis of a light amount of IR light received by the distance measurement sensor 34 and use a deviation amount between IR images updated at a predetermined cycle as a correction amount in a camera shake correction.

The image pickup sensor 35 is constituted of an image pickup device including a two-dimensional image pickup area, such as a CCD (Charge Coupled Device) sensor and a CMOS (Complementary Mental Oxide Semiconductor) sensor, for example. Under control of the control unit 31, the image pickup sensor 35 captures an image of a subject, generates image data, and supplies the image data to the image processing unit 36.

The image processing unit 36 executes predetermined image processing on the captured image supplied from the image pickup sensor 35 on the basis of the distance information supplied from the distance measurement sensor 34. It should be noted that a correspondence relationship between a pixel position of each pixel of the image pickup sensor 35 and a pixel position of each pixel of the distance measurement sensor 34, that is, a positional relationship between the image pickup sensor 35 and the distance measurement sensor 34 is corrected in advance and stored in the storage unit 37.

The image processing unit 36 also carries out processing of converting image data supplied from the image pickup sensor 35 into image signals of a predetermined display format displayable by the display unit 39 and supplying the image signals to the display unit 79, processing of converting the image data into image data of a predetermined file format and recording it in the storage unit 37, and the like.

The storage unit 37 is constituted of a storage medium such as a semiconductor memory, for example, and stores still images and moving images captured by the image pickup sensor 35. Further, the storage unit 37 stores a program executed by the control unit 31, calibration information indicating the positional relationship between the image pickup sensor 35 and the distance measurement sensor 34, and the like.

Under control of the control unit 31, the communication unit 38 exchanges predetermined data, programs, and the like with other apparatuses. For example, the communication unit 38 transmits image data of a captured image that has been subjected to predetermined image processing by the image processing unit 36 to the reception apparatus 13.

The display unit 39 is constituted of a flat-screen display such as an LCD (Liquid Crystal Display) display and an organic EL (Electro Luminescence) display, and displays an image (moving image or still image) captured by the image pickup sensor 35. Further, the display unit 39 also displays an AF window expressing a focus target area, and the like. The display unit 39 is capable of performing display of a live view image that displays an image captured by the image pickup sensor 35 in real time, display of a recording image recorded in the storage unit 37, and the like.

The operation unit 40 includes, for example, a hardware key such as a shutter button and a software key that uses a touch panel laminated on the display unit 39, receives a predetermined operation performed by a user, and supplies an operation signal thereof to the control unit 31. For example, the user touches a predetermined position of a live view image displayed on the display unit 39, and the touch panel as the operation unit 40 detects a touch position of the user. Accordingly, the focus target area or attention area in the captured image is specified and supplied to the control unit 31.

3. Second Configuration Example of Image Pickup Apparatus

Figure 3:
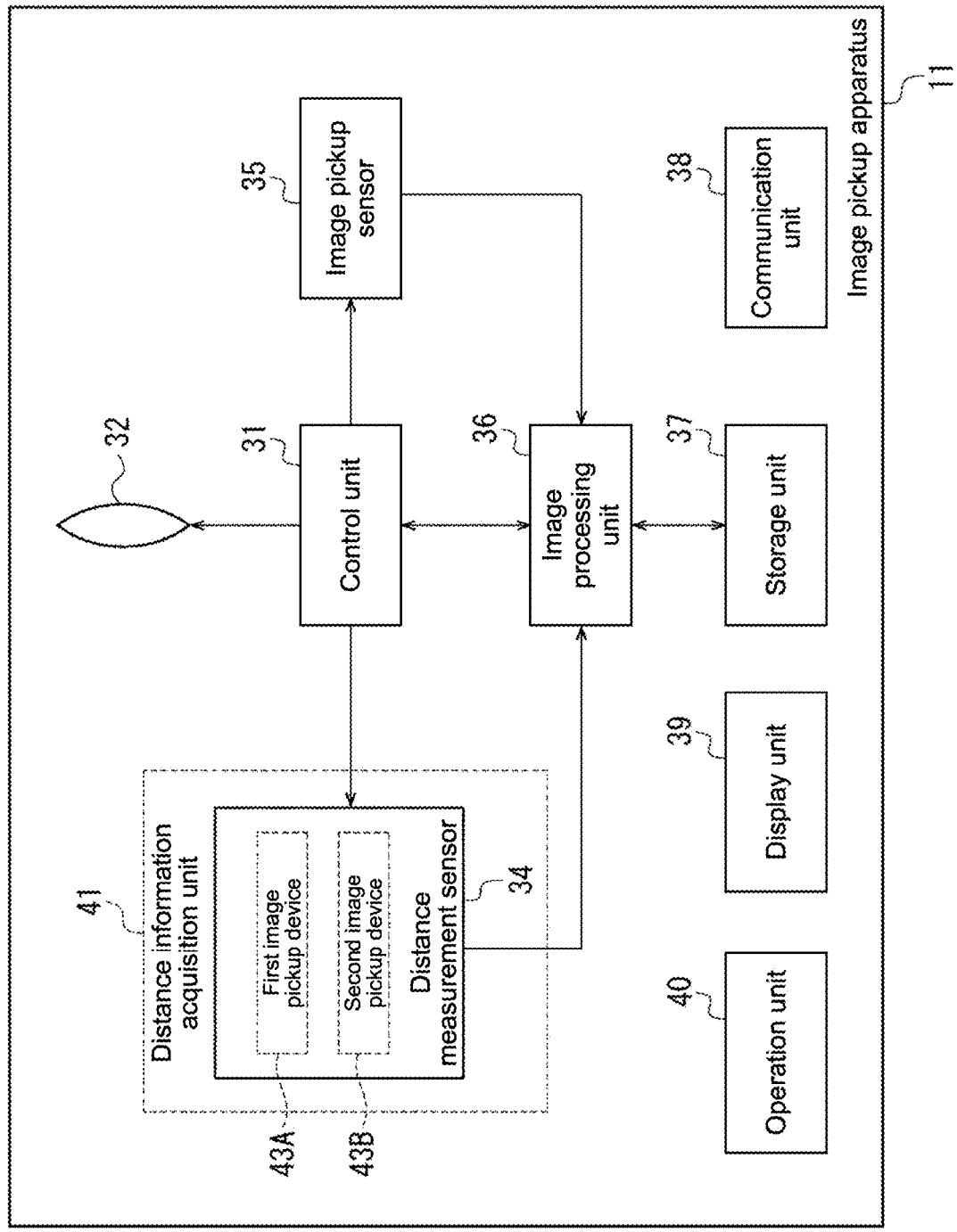
FIG. 3 A block diagram showing a second configuration example of the image pickup apparatus.

FIG. 3 is a block diagram showing a second configuration example of the image pickup apparatus 11.

In FIG. 3, parts corresponding to those of the first configuration example shown in FIG. 2 are denoted by the same reference numerals, and descriptions thereof are omitted as appropriate.

Comparing the second configuration example shown in FIG. 3 with the first configuration example shown in FIG. 2, in the second configuration example, the light-emitting unit 33 is omitted in the distance information acquisition unit 41.

A distance measurement system of the distance measurement sensor 34 in the first configuration example is a so-called active-type distance measurement system that measures a distance to a subject by the distance measurement sensor 34 receiving light emitted from the light-emitting unit 33.

On the other hand, a distance measurement system of the distance measurement sensor 34 in the second configuration example is a so-called passive-type distance measurement system that measures a distance to a subject without requiring the light-emitting unit 33.

The passive-type distance measurement sensor 34 includes a first image pickup device 43A and a second image pickup device 43B that receive visible light, and the first image pickup device 43A and the second image pickup device 43B are arranged in a horizontal direction (lateral direction) while being set apart from each other by a predetermined interval. This distance measurement sensor 34 measures a distance to a subject from two images captured by the first image pickup device 43A and the second image pickup device 43B using a so-called stereo camera system.

It should be noted that first image pickup device 43A and the second image pickup device 43B of the distance measurement sensor 34 may be image pickup devices that receive IR light. In this case, the distance to a subject can be measured regardless of peripheral brightness.

Alternatively, a configuration in which the distance measurement sensor 34 includes only one image pickup device (either one of first image pickup device 43A and second image pickup device 43B), the distance measurement sensor 34 is arranged while being a predetermined interval apart from the image pickup sensor 35 in the horizontal direction (lateral direction), and the distance measurement sensor 34 measures the distance to a subject using an image captured by the distance measurement sensor 34 and an image captured by the image pickup sensor 35, is also possible.

Since both the distance measurement sensor 34 and the image pickup sensor 35 can be constituted of image pickup devices, it is possible to adopt an integrated configuration in which the distance measurement sensor 34 is formed on a first substrate, the image pickup sensor 35 is formed on a second substrate, and the first substrate and the second substrate are laminated.

As described above, the image pickup apparatus 11 is an apparatus including an image pickup function of capturing an image of a subject and a distance measurement function of acquiring distance information with respect to the subject. According to the distance measurement function of the image pickup apparatus 11, distance information can be acquired for each pixel of a captured image obtained by the image pickup function on a one-on-one basis. As this distance measurement function, the active-type or passive-type distance measurement system can be used, or a hybrid type including both the active type and the passive type may be used.

4. Explanation of Image Processing

<Example of Resolution Conversion Processing>

Next, resolution conversion processing carried out by the image processing unit 36 will be described with reference to FIG. 4.

To the image processing unit 36, a captured image 61 is supplied from the image pickup sensor 35, and also a depth map 62 is supplied from the distance measurement sensor 34 as distance information. For example, it is assumed that the captured image 61 is a moving image having a frame rate of 60 FPS (freme per second) and a resolution of 4K (3840*2160). The depth map 62 is, for example, data in which distance information measured by the distance measurement sensor 34 is expressed in gray scale in a pixel unit of the captured image 61 so as to take a darker value as the distance increases.

The user touches a predetermined area of a live view image displayed on the display unit 39 to designate an attention area 81 in the captured image 61. The operation unit 40 detects a touch position of the user and supplies the detected position information of the image to the control unit 31. The position information of the image supplied to the control unit 31 is supplied from the control unit 31 to the image processing unit 36.

The image processing unit 36 specifies the attention area 81 designated by the user from the position information of the image designated by the user, that has been supplied from the control unit 31, and the distance information (depth map 62) supplied from the distance measurement sensor 34. Specifically, the image processing unit 36 detects an object area including the same distance information in a periphery of the position designated by the user, and determines the detected area as the attention area 81. An area other than the attention area 81 of the captured image 61 is set as a non-attention area 82.

It should be noted that a method of designating the attention area 81 is not limited to this example. For example, as the user touches a predetermined area of a live view image displayed on the display unit 39, distance information of the touched position may be displayed on the display unit 39 so that the user can designate the attention area 81 by inputting the displayed distance information using a numeric keypad or the like. Alternatively, the user may designate the attention area 81 as a rectangular area.

Next, the image processing unit 36 generates two images, that is, a first image 91 in which the attention area 81 has a high resolution (first resolution) that is the same as that of the captured image 61 and a second image 92 in which the non-attention area 82 has a resolution lower than that of the captured image 61 (second resolution).

Figure 4:
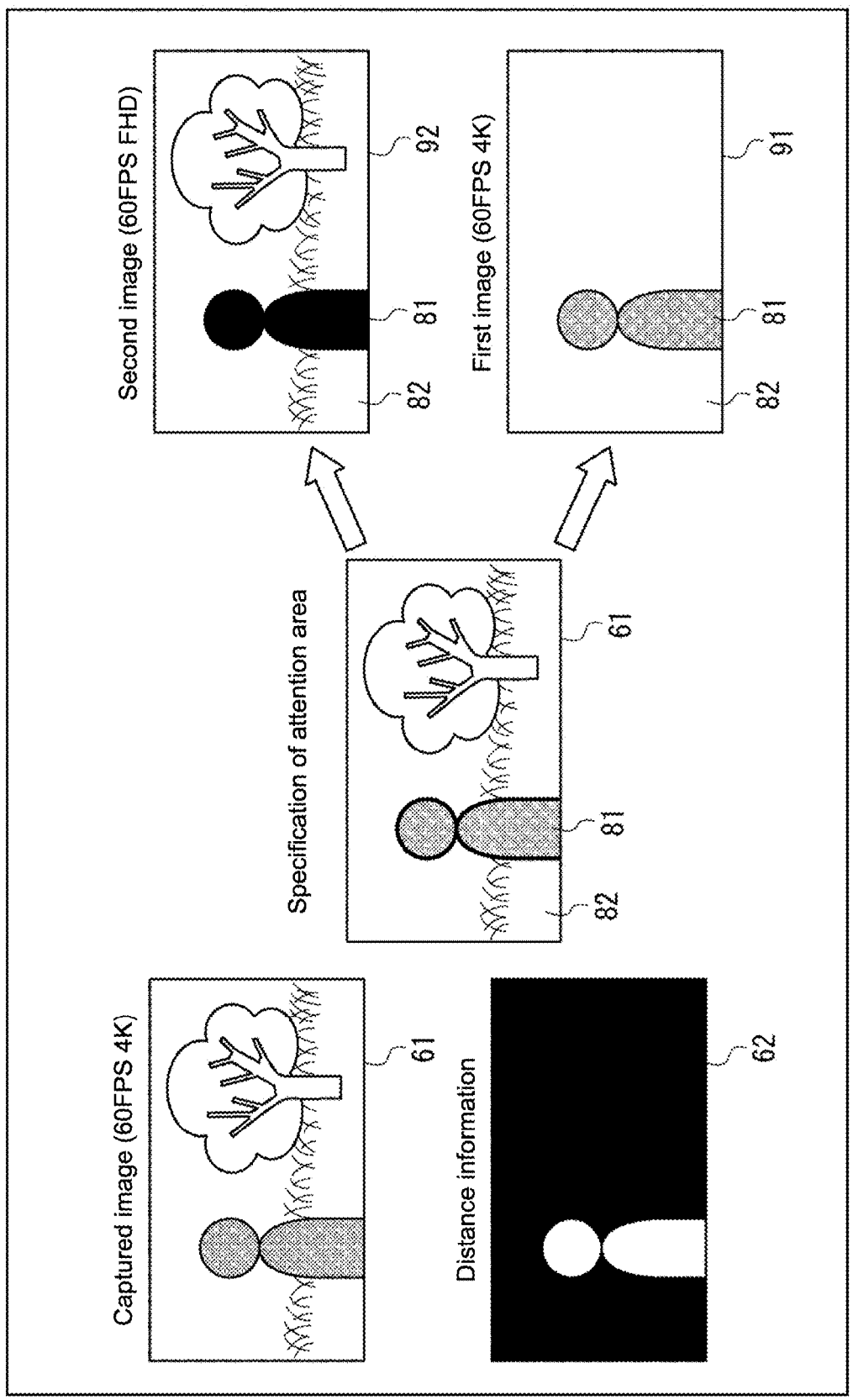
FIG. 4 A diagram that explains resolution conversion processing carried out by an image processing unit.

For example, as shown in FIG. 4, the image processing unit 36 generates two images, that is, a first image 91 having the same resolution of 4K as the captured image 61 and a second image 92 having an FHD (Full HD: 1920*1080) resolution lower than that of the captured image 61.

Since it is only necessary to assure only image information of the attention area 81 regarding the first image 91, pixel values of respective pixels of the non-attention area 82 in the first image 91 are replaced by the same values. Similarly, since it is only necessary to assure only image information of the non-attention area 82 regarding the second image 92, pixel values of respective pixels of the attention area 81 in the second image 92 are replaced by the same values. The processing of replacing the pixel values of the respective pixels by the same values is called masking processing in this embodiment.

As described above, the image processing unit 36 divides the captured image 61 into a first area (attention area 81) and a second area (non-attention area 82) on the basis of the distance information obtained by the distance measurement sensor 34, and executes resolution conversion processing for generating two images in which resolutions are converted such that the resolutions differ between the first area and the second area.

The generated two images are transmitted from the communication unit 38 of the image pickup apparatus 11 to the reception apparatus 13, and the received two images are synthesized on the reception apparatus 13 side.

Referring to FIG. 5, descriptions will be given on synthesis processing in which the reception apparatus 13 synthesizes the first image 91 and the second image 92 transmitted from the image pickup apparatus 11.

Assuming that the captured image 61 is a moving image, FIG. 5 shows first images 91-1 to 91-8 and second images 92-1 to 92-8 of 8 consecutive frames and synthetic images 93-1 to 93-8 obtained by respectively synthesizing the corresponding first images 91 and second images 92.

To the first image 91 and the second image 92 transmitted from the image pickup apparatus 11, frame synthesis information for associating two images to be synthesized in a case where the reception apparatus 13 carries out the synthesis processing of synthesizing two images, is added as additional information.

In a case where the resolutions of the first image 91 and the second image 92 are converted, for example, "frame identification number+division number+subframe identification number" is added to each of the first image 91 and the second image 92 as the frame synthesis information as shown in FIG. 5. Here, the frame corresponds to the captured image 61, and the subframe corresponds to the first image 91 and the second image 92. The "frame identification number" is an identification number of the captured image 61 before the image pickup apparatus 11 carries out the resolution conversion processing and also corresponds to an identification number of the synthetic image 93 obtained after the synthesis processing. The "division number" corresponds to the number of images generated from a single captured image 61 by the image pickup apparatus 11 carrying out the resolution conversion processing, and is "2" in this case. The "subframe identification number" is a number for identifying two images generated from a single captured image 61 by the image pickup apparatus 11 carrying out the resolution conversion processing, and in this case, "1" is allocated to the first image 91, and "2" is allocated to the second image 92.

The reception apparatus 13 identifies the two images to be synthesized, that is, the first image 91 and the second image 92, on the basis of the frame synthesis information added to the images, and generates a synthetic image 93 by synthesizing those images.

Specifically, the reception apparatus 13 synthesizes the first image 91-1 and the second image 92-1 to generate a synthetic image 93-1, and synthesizes the first image 91-2 and the second image 92-2 to generate a synthetic image 93-2. After that, synthetic images 93-3, 93-4, . . . are generated similarly.

The synthetic image 93 has a 4K resolution and is generated by interpolation in which 4 pixels at corresponding positions in the synthetic image are allocated with respect to one FHD pixel.

<Example of Frame Rate Conversion Processing>

In the examples shown in FIGS. 4 and 5, the first image 91 and the second image 92 generated from the captured image 61 have different resolutions. Next, an example where frame rates differ will be described.

Figure 6:
FIG. 6 A diagram that explains frame rate conversion processing.

FIG. 6 shows first images 91 and second images 92 generated by the image pickup apparatus 11 carrying out frame rate conversion processing, and a synthetic image 93 obtained by synthesizing those images.

The image processing unit 36 divides the captured image 61 into a first area (attention area 81) and a second area (non-attention area 82) on the basis of the distance information obtained by the distance measurement sensor 34, and executes the frame rate conversion processing to generate two images in which frame rates are converted such that the frame rates differ between the first area and the second area.

Specifically, the image processing unit 36 generates two images, that is, the first image 91 having the same frame rate of 60 FPS as the captured image 61 and the second image 92 having a frame rate of 30 FPS lower than the frame rate of the captured image 61.

The point of carrying out the masking processing of replacing the pixel values of the respective pixels in the area with fixed values, on the non-attention area 82 of the first image 91 and the attention area 81 of the second image 92 is similar to the resolution conversion processing described above.

Assuming that the image processing unit 36 has currently generated 8 frames of first images 91-1 to 91-8 for the first image 91 having a high frame rate as shown in FIG. 6, 4 frames of second images 92-1 to 92-4 are generated for the second image 92 having half the frame rate.

The image processing unit 36 generates "frame identification number+division number+subframe identification number+repetition number" as frame synthesis information and adds it to each of the first image 91 and the second image 92. The "repetition number" indicates the number of times the image to which the frame synthesis information is added is used repetitively.

Since the "repetition number" of the second image 92-1 is "2", the second image 92-1 is used for two synthesis processing. In other words, the reception apparatus 13 synthesizes the first image 91-1 and the second image 92-1 to generate a synthetic image 93-1, and then synthesizes the first image 91-2 and the second image 92-1 to generate a synthetic image 93-2. Similarly, the reception apparatus 13 synthesizes the first image 91-3 and the second image 92-2 to generate a synthetic image 93-3, and then synthesizes the first image 91-4 and the second image 92-2 to generate a synthetic image 93-4.

<Example of Black Image Insertion Processing>

Next, with reference to FIG. 7, an example of a case of inserting a black image on a low frame rate side in the frame rate conversion processing as described with reference to FIG. 6 will be described. It should be noted that the first image 91 and the second image 92 also have different resolutions in the example of FIG. 7, but similar processing can be executed even with the same resolution.

In the frame rate conversion processing of FIG. 6, there may be a case where an image deviation between frames that is caused by a movement appears as a shadow, depending on a movement of a subject on a high frame rate side. In order to visually eliminate the shadow caused by this image deviation, the synthetic image 93 is generated by inserting a black image on a low frame rate side on the reception apparatus 13 side.

Similar to FIG. 6, the image processing unit 36 generates two images, that is, a first image 91 having a high frame rate of 60 FPS and a second image 92 having a low frame rate of 30 FPS. The generated two images are transmitted to the reception apparatus 13.

As frame synthesis information in the case of inserting a black image, "frame identification number+division number+subframe identification number+number of transmission frames" is added to each of the first image 91 and the second image 92. The "number of transmission frames" indicates a total number of frames to be transmitted from the image pickup apparatus 11 to the reception apparatus 13 in each frame identified by the frame identification number. For example, in a frame with the frame identification number "1", the number of transmission frames becomes "2" since the two images of the first image 91-1 and the second image 92-1 are transmitted, and in a frame with the frame identification number "2", the number of transmission frames becomes "1" since only one image, that is, the first image 91-2 is transmitted.

In a case where the "division number" of the frame synthesis information is "2" and the "number of transmission frames" is "2", the reception apparatus 13 synthesizes the first image 91 and the second image 92 to generate the synthetic image 93. On the other hand, in a case where the "division number" of the frame synthesis information is "2" and the "number of transmission frames" is "1", the reception apparatus 13 synthesizes the first image 91 on the high frame rate side with a black image to generate the synthetic image 93.

Figure 7:
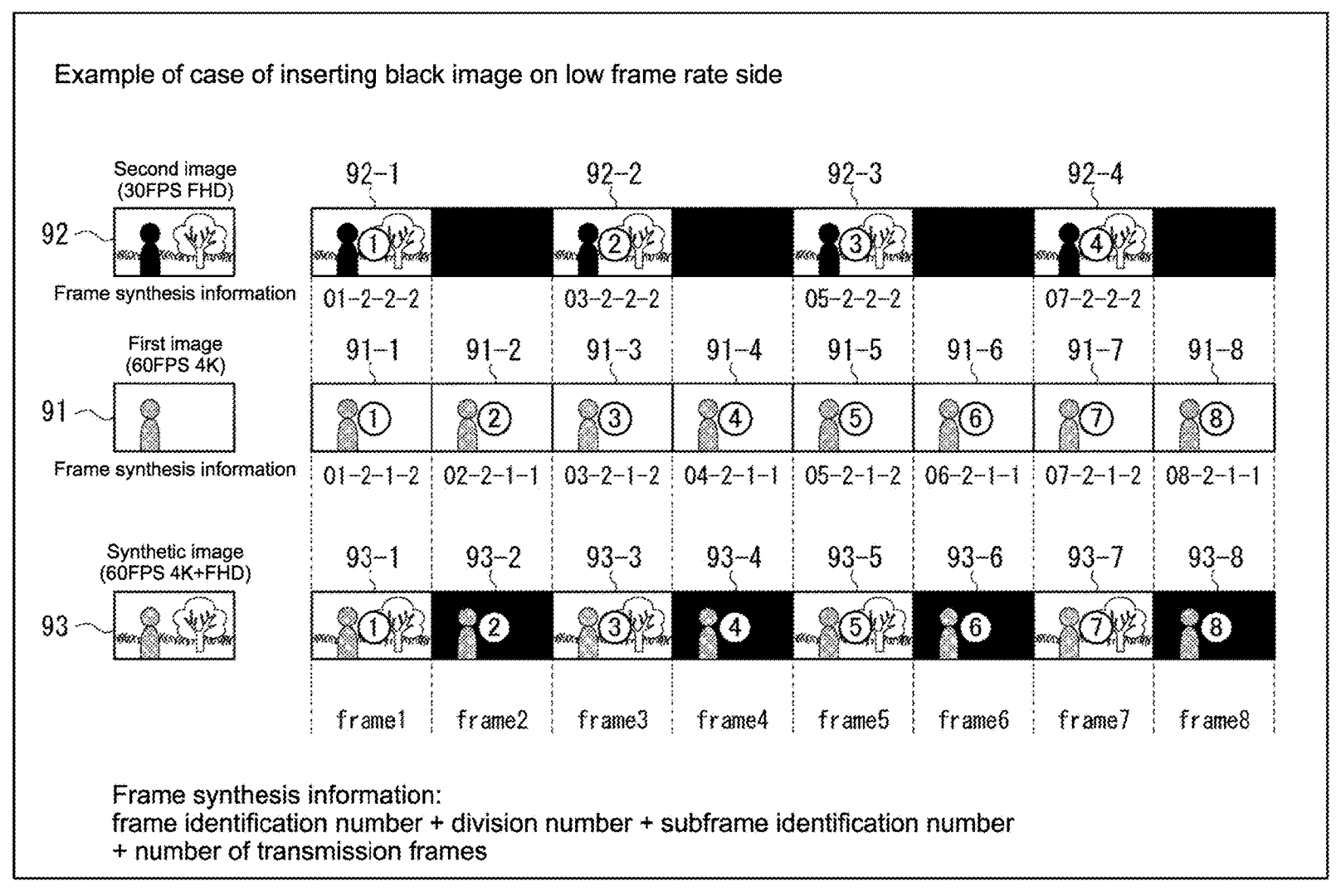

In the example shown in FIG. 7, the first image 91-1 and the second image 92-1 are synthesized to generate the synthetic image 93-1, and the first image 91-2 and the black image are synthesized to generate the synthetic image 93-2. The synthetic image 93-2 can be generated by compensating the pixel values of the non-attention area 82 of the first image 91-2 by the pixel values of the black image.

In this way, in the case of carrying out the frame rate conversion processing, a black image may be inserted on the low frame rate side to be synthesized with the first image 91 having a high frame rate.

<Example of Resolution/Frame Rate Conversion Processing>

Figure 8:
FIG. 8 A diagram that explains resolution/frame rate conversion processing.

FIG. 8 shows an example of resolution/frame rate conversion processing for generating a first image 91 and a second image 92 in which both the resolution and the frame rate are converted with respect to the captured image 61.

In FIG. 8, a method of adding frame synthesis information is similar to that of the frame rate conversion processing shown in FIG. 6, and the association between the first image 91 and the second image 92 to be synthesized is similar to that of the frame rate conversion processing.

In the synthesis processing of synthesizing the first image 91 and the second image 92 by the resolution/frame rate conversion processing, processing of interpolating low-resolution pixels by quadruple pixels of a high resolution, which has been carried out in the synthesis processing corresponding to the resolution conversion processing shown in FIG. 5, is added to the synthesis processing of synthesizing the first image 91 and the second image 92 by the frame rate conversion processing described above.

<Example of Gradation Count Conversion Processing>

Next, descriptions will be given on gradation count conversion processing for giving a difference in gradation counts between the first image 91 and the second image 92 generated from the captured image 61.

The image processing unit 36 divides the captured image 61 into a first area (attention area 81) and a second area (non-attention area 82) on the basis of the distance information obtained by the distance measurement sensor 34, and executes the gradation count conversion processing for generating two images in which gradation counts are converted such that the gradation counts differ between the first area and the second area.

For example, the image processing unit 36 generates two images, that is, a first image 91 having a gradation count of 32 bits that is the same as that of the captured image 61 and a second image 92 having a gradation count of 16 bits lower than that of the captured image 61.

The point of carrying out the masking processing on the non-attention area 82 of the first image 91 and the attention area 81 of the second image 92 is similar to the resolution conversion processing and the like described above.

The reception apparatus 13 that has received the first image 91 and the second image 92 having different gradation counts generates a synthetic image 93 that uses the pixel values of the first image 91 for the attention area 81 and the pixel values of the second image 92 for the non-attention area 82, and displays it on the display apparatus 14.

It should be noted that the image processing unit 36 is also capable of executing conversion processing in which the conversion of gradation counts and the conversion of resolutions or frame rates is combined as appropriate.

5. Explanation Using Flowcharts

<Image Transmission Processing Flow>

Figure 9:
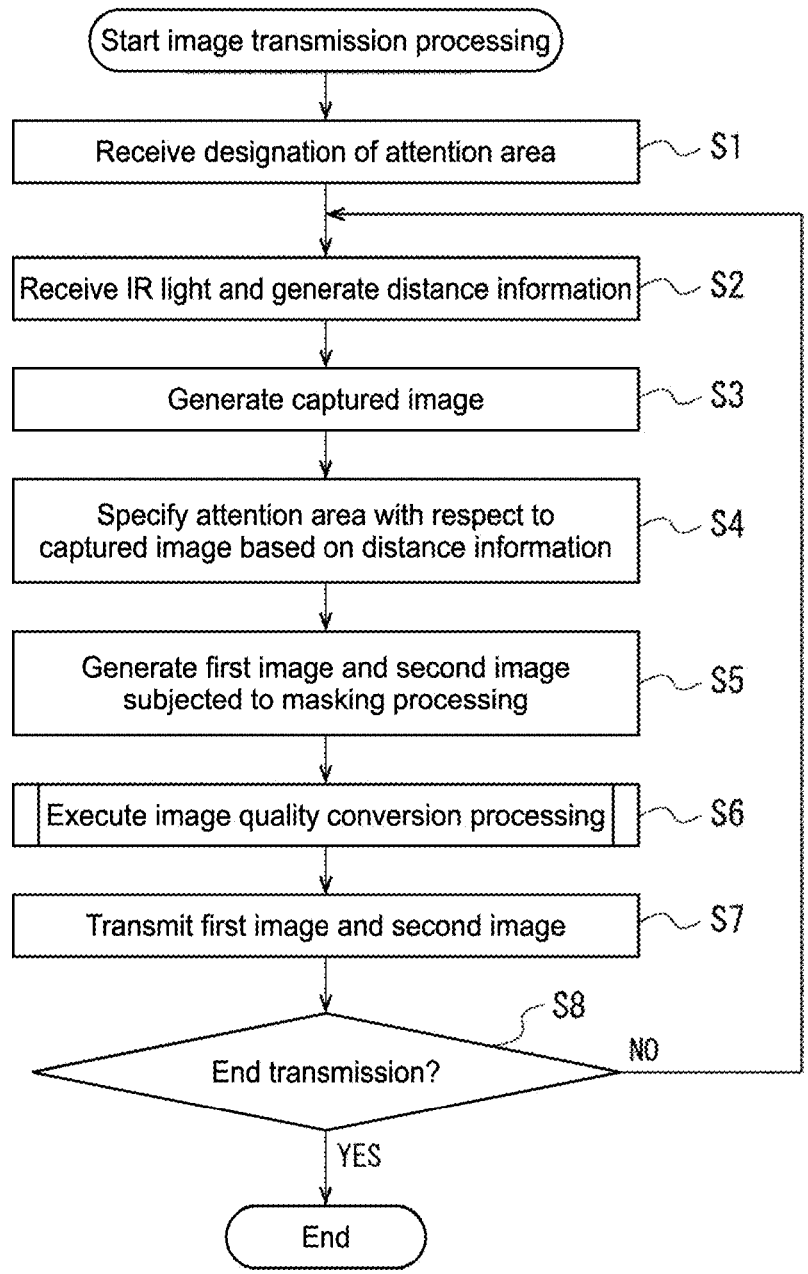
FIG. 9 A flowchart that explains image transmission processing by the image pickup apparatus.

Next, with reference to the flowchart of FIG. 9, image transmission processing for transmitting an image captured by the image pickup apparatus 11 to the reception apparatus 13 will be described. In the image pickup apparatus 11, a live view image of a captured image is displayed on the display unit 39. For example, when the user designates the attention area 81 in the captured image 61 by touching a predetermined area of the live view image, the processing of FIG. 9 is started.

First, in Step S1, the operation unit 40 detects a touch position of the user and receives designation of an attention area. Position information of the image designated by the user is supplied to the image processing unit 36 via the control unit 31.

In Step S2, under control of the control unit 31, the distance measurement sensor 34 receives IR light emitted from the light-emitting unit 33 to generate distance information, and supplies the distance information to the image processing unit 36.

In Step S3, under control of the control unit 31, the image pickup sensor 35 captures an image of a subject to generate a captured image 61, and supplies the captured image 61 to the image processing unit 36.

In Step S4, the image processing unit 36 specifies the attention area 81 with respect to the captured image 61 on the basis of the distance information supplied from the distance measurement sensor 34. Specifically, the image processing unit 36 detects an object area including the same distance information in a periphery of the position designated by the user in the live view image, in the captured image 61, and determines the detected area as the attention area 81. Further, the image processing unit 36 sets an area of the captured image 61 excluding the attention area 81 as the non-attention area 82.

In Step S5, the image processing unit 36 generates a first image 91 in which the masking processing has been performed on the non-attention area 82 and a second image 92 in which the masking processing has been performed on the attention area 81 as shown in FIG. 4. At this stage, the first image 91 and the second image 92 are images that differ from the captured image 61 only in the presence or absence of the masking processing.

In Step S6, the image processing unit 36 executes image quality conversion processing for converting at least one of a resolution, frame rate, and gradation count to differ between the first image 91 and the second image 92.

Here, as to which of the resolution, frame rate, and gradation count is to differ between the first image 91 and the second image 92 in executing the conversion processing is determined in advance by the user designating on a setting screen or the like, for example. It is also possible to enable the resolution, frame rate, and gradation count to be set by the user for each of the first image 91 and the second image 92.

Figure 10:
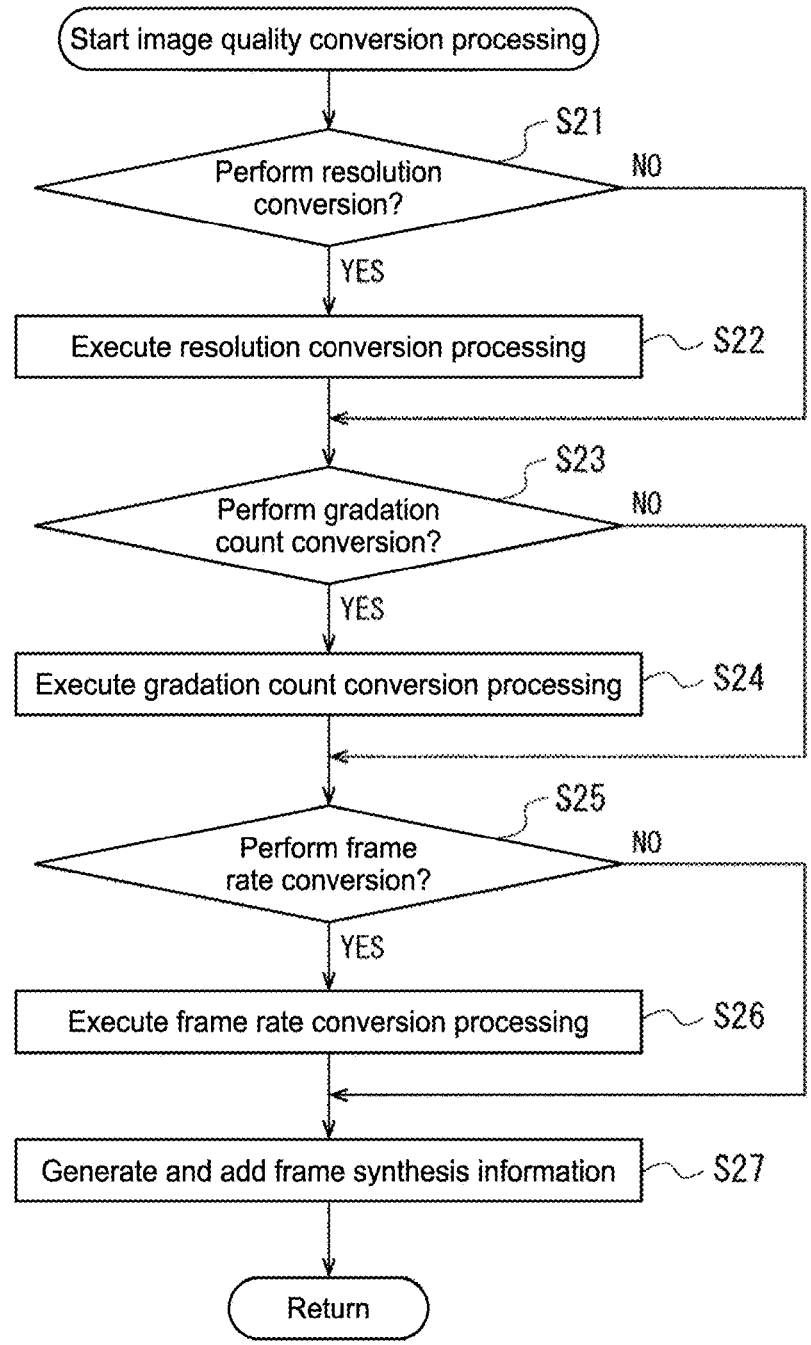
FIG. 10 A flowchart that explains image equality conversion processing of Step S6 shown in FIG. 9.

FIG. 10 is a flowchart that explains details of the image quality conversion processing executed in Step S6 of FIG. 9.

It should be noted that the processing of the following Steps S21 to S27 is executed only on the second image 92 in a case where the captured image 61 and the first image 91 have the same resolution, frame rate, and gradation count irrespective of the presence or absence of the masking processing as in the examples explained with reference to FIGS. 4 to 8.

On the other hand, for example, in a case where the resolution, frame rate, or gradation count of the first image 91 differs from that of the captured image 61 as in the example where the resolution of the captured image 61 is 8K (7680*4320), the resolution of the first image 91 is 4K, and the resolution of the second image 92 is FHD, the processing of the following Steps S21 to S27 is executed on both the first image 91 and the second image 92.

In the image quality conversion processing, in Step S21, the image processing unit 36 first judges whether to perform resolution conversion.

In a case where it is judged in Step S21 to perform the resolution conversion, the processing advances to Step S22, and the image processing unit 36 executes the resolution conversion processing for converting the resolution of the first image 91 or the second image 92.

On the other hand, in a case where it is judged in Step S21 to not perform the resolution conversion, the processing of Step S22 is skipped.

Next, in Step S23, the image processing unit 36 judges whether to perform gradation count conversion.

In a case where it is judged in Step S23 to perform the gradation count conversion, the processing advances to Step S24, and the image processing unit 36 executes the gradation count conversion processing for converting the gradation count of the first image 91 or the second image 92.

On the other hand, in a case where it is judged in Step S23 to not perform the gradation count conversion, the processing of Step S24 is skipped.

Next, in Step S25, the image processing unit 36 judges whether to perform frame rate conversion.

In a case where it is judged in Step S25 to perform the frame rate conversion, the processing advances to Step S26, and the image processing unit 36 executes the frame rate conversion processing for converting the frame rate of the first image 91 or the second image 92.

On the other hand, in a case where it is judged in Step S25 to not perform the frame rate conversion, the processing of Step S26 is skipped.

Next, in Step S27, the image processing unit 36 generates and adds frame synthesis information to each of the first image 91 and the second image 92.

Upon ending the processing of Step S27, the image quality conversion processing as Step S6 of FIG. 9 is ended, and the processing returns to FIG. 9 to advance to Step S7.

In Step S7, the communication unit 38 transmits the first image 91 and the second image 92 generated by the image processing unit 36 to the reception apparatus 13. Image data of the first image 91 and the second image 92 also includes frame synthesis information.

In Step S8, the control unit 31 judges whether to end the transmission. For example, in a case where an operation of stopping the transmission of the captured image is performed by the user or in a case where the transmission of the image within a predetermined period is ended, it is judged in Step S8 that the transmission is to be ended.

In a case where it is judged in Step S8 that the transmission is not to be ended, the processing returns to Step S2, and the processing of Steps S2 to S8 described above is repeated. As a result, the first image 91 and the second image 92 are generated with respect to the captured image 61 which is captured next, and are transmitted to the reception apparatus 13.

On the other hand, in a case where it is judged in Step S8 that the transmission is to be ended, the image transmission processing of FIG. 9 is ended.

<Image Reception Processing Flow>

Next, with reference to the flowchart of FIG. 11, image reception processing executed by the reception apparatus 13 in correspondence with the image transmission processing of the image pickup apparatus 11 will be described.

First, in Step S41, the reception apparatus 13 receives (acquires) the first image 91 and the second image 92 transmitted from the image pickup apparatus 11.

In Step S42, the reception apparatus 13 synthesizes the first image 91 and the second image 92 on the basis of the frame synthesis information added to each of the received first image 91 and second image 92, to thus generate a synthetic image 93.

In Step S43, the reception apparatus 13 outputs the generated synthetic image 93 to the display apparatus 14 for display.

In Step S44, the reception apparatus 13 judges whether to end the reception. In Step S44, for example, it is judged that the reception is to be ended in a case where an image is not transmitted from the image pickup apparatus 11 or in a case where an operation to end the image reception is performed.

In a case where it is judged in Step S44 that the reception is not to be ended, the processing returns to Step S41, and the processing of Steps S41 to S44 described above is repeated. As a result, the first image 91 and the second image 92 transmitted next from the image pickup apparatus 11 are received, and a synthetic image 93 is generated and displayed on the display apparatus 14.

Figure 11:
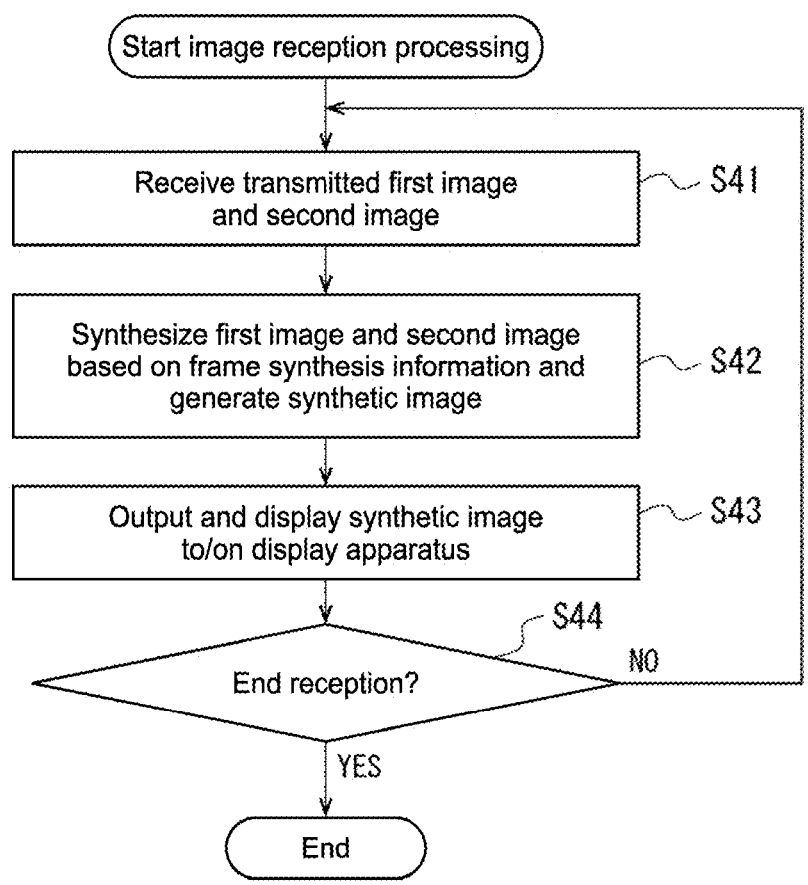
FIG. 11 A flowchart that explains image reception processing by a reception apparatus.

On the other hand, in a case where it is judged in Step S44 that the reception is to be ended, the image reception processing of FIG. 11 is ended.

In the image transmission processing by the image pickup apparatus 11 and the image reception processing by the reception apparatus 13 described above, the image pickup apparatus 11 generates and transmits the first image 91 and the second image 92, and the reception apparatus 13 receives and synthesizes the first image 91 and the second image 92 and causes it to be displayed on the display apparatus 14.

It should be noted that the processing of synthesizing the first image 91 and the second image 92 may be performed on the image pickup apparatus 11 side. Specifically, the image pickup apparatus 11 may generate the synthetic image 93 from the generated first image 91 and second image 92 and transmit it, so that the reception apparatus 13 receives the synthetic image 93 and displays it on the display apparatus 14.

<Image Transmission Processing Flow in Case of Generating and Transmitting Single Image>

In a case where the frame rate is not to be converted as the image quality conversion processing, there is no need to generate two images of the first image 91 and the second image 92 from the captured image 61, and a single image in which at least one of the resolution and the gradation count is converted with respect to the captured image 61 may be generated and transmitted.

Figure 12:
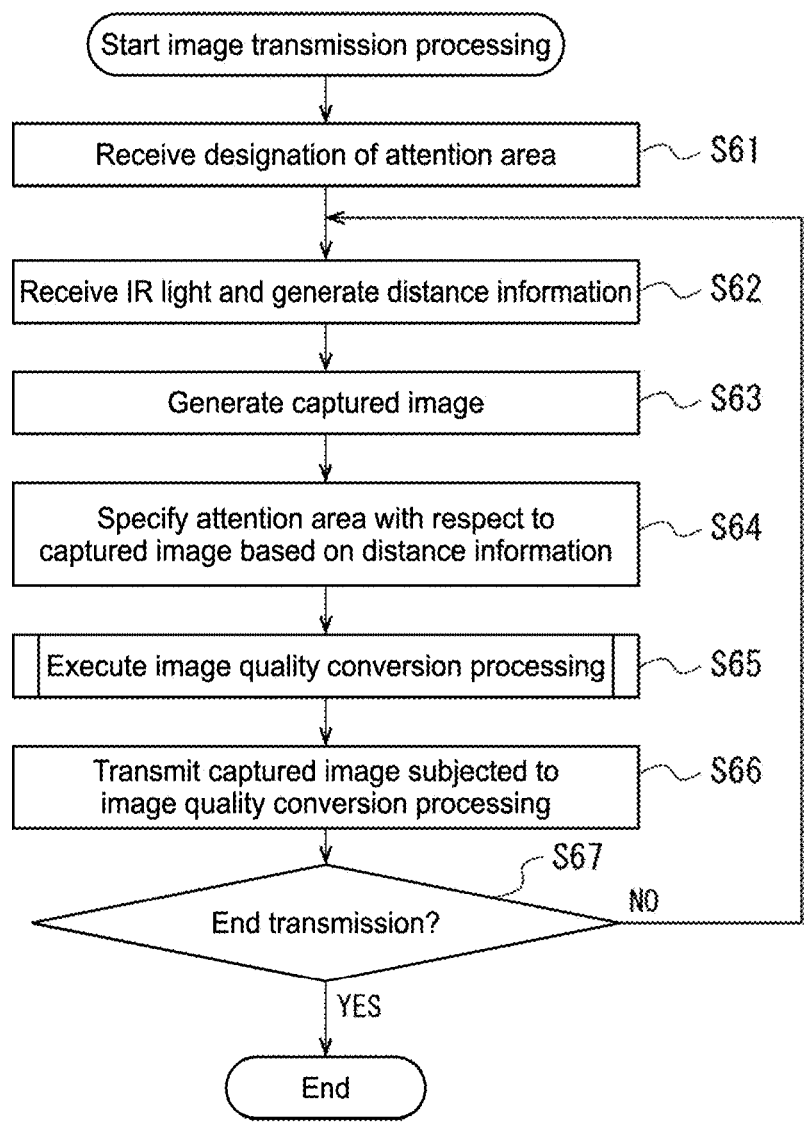
FIG. 12 A flowchart that explains image transmission processing in a case of transmitting one image.

FIG. 12 is a flowchart that explains the image transmission processing in the case where the captured image 61 transmits a single image.

Since the processing of Steps S61 to S64 of the image transmission processing shown in FIG. 12 is the same as the processing of Steps S1 to S4 of the image transmission processing shown in FIG. 9, descriptions thereof will be omitted.

In Step S65, the image quality conversion processing described with reference to FIG. 10 is executed on the attention area 81 and the non-attention area 82 of the captured image 61. It should be noted that in Step S25 of FIG. 10, it is judged that the frame rate conversion is not to be performed, and the generation of the frame synthesis information in Step S27 is omitted.

In Step S66, the communication unit 38 transmits the captured image 61 subjected to the image quality conversion processing of Step S65 to the reception apparatus 13.

In Step S67, the control unit 31 judges whether to end the transmission. In a case where it is judged that the transmission is to be ended, the image transmission processing is ended. On the other hand, in a case where it is judged in Step S67 that the transmission is not to be ended, the processing returns to Step S62, and the processing of Steps S62 to S67 described above is repeated.

<Image Reception Processing Flow in Case of Generating and Transmitting Single Image>

Figure 13:
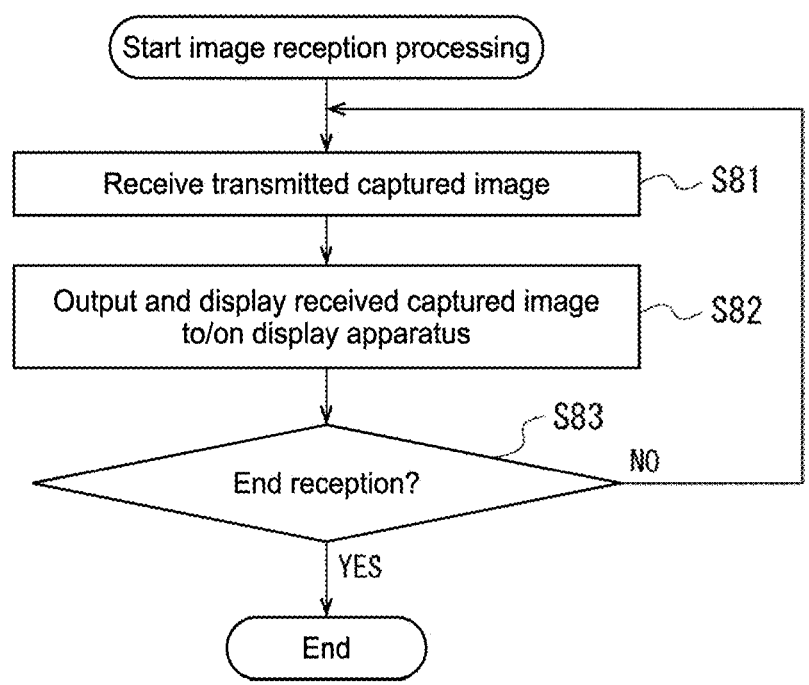
FIG. 13 A flowchart that explains image reception processing in a case of receiving one image.

FIG. 13 is a flowchart that explains the image reception processing of the reception apparatus 13 in the case where the captured image 61 transmits a single image.

First, in Step S81, the reception apparatus 13 receives (acquires) the captured image 61 that has been transmitted from the image pickup apparatus 11 and subjected to the image quality conversion processing.

Then, in Step S82, the reception apparatus 13 outputs the received captured image 61 subjected to the image quality conversion processing to the display apparatus 14 and causes it to be displayed on the display apparatus 14.

In Step S83, the control unit 31 judges whether to end the reception. In a case where it is judged to end the reception, the image reception processing is ended. On the other hand, in a case where it is judged in Step S83 that the reception is not to be ended, the processing returns to Step S81, and the processing of Steps S81 to S83 described above is repeated.

As described above, in a case where the frame rate conversion is not performed as the image quality conversion processing, the captured image 61 obtained after executing the image quality conversion processing on at least one of the resolution and the gradation count with respect to at least one of the attention area 81 and the non-attention area 82 of the captured image 61 obtained by the image pickup sensor 35 is transmitted to the reception apparatus 13, and the reception apparatus 13 causes the received captured image 61 to be displayed on the display apparatus 14 as it is.

Whether to transmit two images or a single image in the case where the frame rate conversion is not performed may be determined by the user according to a setting of an operation mode, for example.

6. Conclusion

In the image processing system 1 shown in FIG. 1, the image pickup apparatus 11 includes at least the distance measurement sensor 34 and the image pickup sensor 35, divides an image area of the captured image 61 obtained by the image pickup sensor 35 into two areas of the attention area 81 and the non-attention area 82 on the basis of distance information obtained by the distance measurement sensor 34, and executes image processing on at least one of the attention area 81 and the non-attention area 82 such that the two areas have different image qualities.

As the image processing, the image quality conversion processing that causes at least one of the resolution, the gradation count, and the frame rate to differ between the attention area 81 and the non-attention area 82 is performed.

For example, the image processing unit 36 of the image pickup apparatus 11 generates two images, that is, the first image 91 in which the resolution of the attention area 81 is set to be the first resolution (e.g., same resolution as captured image 61) and the second image 92 in which the resolution of the non-attention area 82 is set to be the second resolution lower than the first resolution.

Alternatively, the image processing unit 36 generates a single image in which the resolution of the attention area 81 is set to be the first resolution (e.g., same resolution as captured image 61) and the resolution of the non-attention area 82 is set to be the second resolution lower than the first resolution.

Alternatively, for example, the image processing unit 36 generates two images, that is, the first image 91 in which the gradation count of the attention area 81 is the first gradation count (e.g., same gradation count as captured image 61) and the second image 92 in which the gradation count of the non-attention area 82 is the second gradation count lower than the first gradation count.

Alternatively, the image processing unit 36 generates a single image in which the gradation count of the attention area 81 is the first gradation count (e.g., same gradation count as captured image 61) and the gradation count of the non-attention area 82 is the second gradation count lower than the first gradation count.

Alternatively, for example, the image processing unit 36 generates two images, that is, the first image 91 in which the frame rate of the attention area 81 is the first frame rate (e.g., same frame rate as captured image 61) and the second image 92 in which the frame rate of the non-attention area 82 is the second frame rate lower than the first frame rate.

In the case of generating two images, the masking processing is performed on the non-attention area 82 of the first image 91, and the masking processing is performed on the attention area 81 of the second image 92.

Since the image quality conversion processing by the image processing unit 36 is processing for reducing at least one of the resolution, the gradation count, and the frame rate regarding the non-attention area 82, even in a case where two images (first image 91 and second image 92) are generated from a single captured image 61 and transmitted, a transmission data amount is reduced.

Using an example of a single 4K-standard (Digital Cinema Initiatives 4K) image for digital cinema, a data amount compression effect will be discussed.

As in the example shown in FIG. 5, a case where the image pickup apparatus 11 generates two images, that is, the first image 91 in which the resolution of the attention area 81 is 4K and the second image 92 in which the resolution of the non-attention area 82 is FHD, from a single 4K captured image 61, will be discussed.

The bit count of the single 4K image becomes 36 bits (gradation count 12 bits×respective RGB)*4096 (pix)*2160 (pix)=318,504,960 bits.

When calculating the total bit count of the two images of the first image 91 and the second image 92 assuming that 50% of the area of the single captured image 61 is the attention area 81 and the remaining 50% of the area is the non-attention area 82, 318,504,960 bits*0.5 (first image 91)+318,504,960 bits*0.5/4 (second image 92)=199,065,600 bits is established.

Therefore, the data amount to be transmitted can be compressed to about 199,065,600/318,504,960=62.5% for transmission.

As described above, according to the image processing by the image processing unit 36, image data can be compressed and transmitted using distance information. This compression technology is a compression technology that does not require information in a time axis direction, unlike a compression technology that uses the information in a time axis direction regarding a motion vector, an inter-frame prediction, a motion compensation, and the like, such as MPEG2 and MPEG4.

In the moving image compression by the image processing unit 36, since information of adjacent frames in the time axis direction is not required and compression within the same frame using distance information is performed, it is possible to compress and transmit images in real time.

For example, in a case of performing mosaic processing (blur processing) by lowering a resolution of a partial area of an image, it has been necessary to carry out such processing as post-processing in the past, but since the image processing of the present technology enables the resolution to be converted in real time for transmission, live transmission of a mosaic-processed image also becomes possible.

Further, since the image processing is performed within the same frame and there is no image correlation with adjacent frames, it also becomes possible to generate a moving image using a synthetic image obtained by synthesizing a first image 91 at a predetermined time and a second image 92 at a time several frames behind that time.

Although the descriptions have been given only on the moving image in the examples described above, since the image processing within the same frame is performed, it goes without saying that the present technology is similarly applicable to a still image.

Further, although the descriptions have been given on the example where the captured image 61 is divided into two areas, that is, the attention area 81 and the non-attention area 82, in the examples described above, it is also possible to divide the captured image 61 into three or more areas so as to execute the image processing such that at least one of the areas has image quality different from those of the other areas.

7. Explanation on Computer to Which Present Technology is Applied

The series of processing described above, that is carried out by the control unit 31, the image processing unit 36, and the like, can be executed by hardware or software. In a case where the series of processing is executed by software, a program configuring the software is installed in a computer such as a microcomputer.

Figure 14:
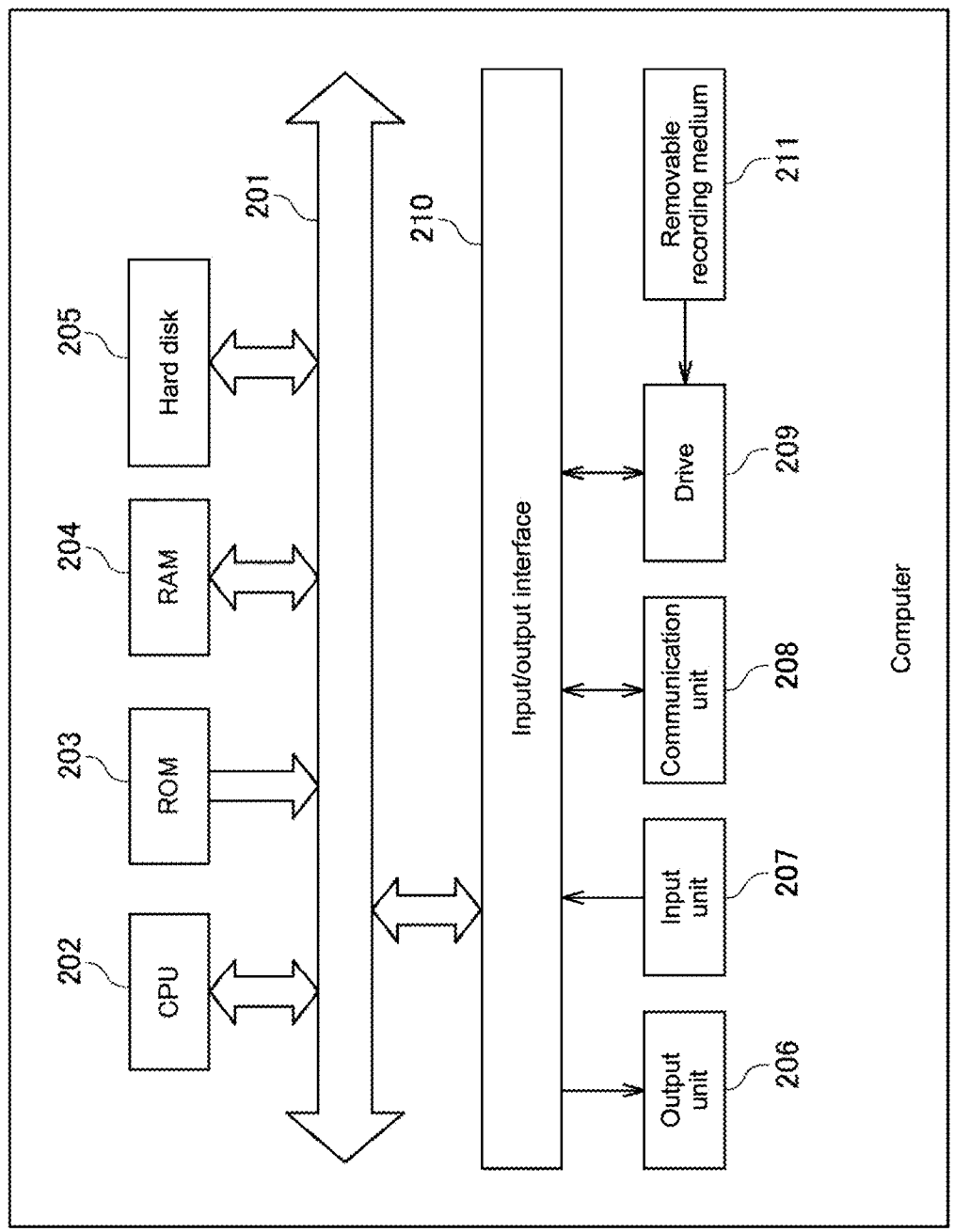
FIG. 14 A block diagram showing a configuration example of one embodiment of a computer to which the present technology is applied.

FIG. 14 is a block diagram showing a configuration example of an embodiment of a computer in which a program for executing the series of processing described above is installed.

The program can be prerecorded in a hard disk 205 or a ROM 203 as a built-in recording medium of the computer.

Alternatively, the program can be stored (recorded) in a removable recording medium 211. Such a removable recording medium 211 can be provided as so-called packaged software. Here, examples of the removable recording medium 211 include a flexible disk, a CD-ROM (Compact Disc Read Only Memory), an MO (Magneto Optical) disc, a DVD (Digital Versatile Disc), a magnetic disk, a semiconductor memory, and the like.

It should be noted that in addition to installing the program in a computer from the removable recording medium 211 as described above, the program can be downloaded to a computer via a communication network or a broadcasting network and installed in the built-in hard disk 205. In other words, for example, the program can be wirelessly transferred from a download site to the computer via an artificial satellite for digital satellite broadcasting or wiredly transferred to the computer via a network such as a LAN (Local Area Network) and the Internet.

The computer incorporates therein a CPU (Central Processing Unit) 202, and an input/output interface 210 is connected to the CPU 202 via a bus 201.

When a command is input by the user operating an input unit 207 via the input/output interface 210, the CPU 202 executes the program stored in the ROM (Read Only Memory) 203 accordingly. Alternatively, the CPU 202 loads a program stored in the hard disk 205 into a RAM (Random Access Memory) 204 and executes the program.

Accordingly, the CPU 202 carries out the processing according to the flowcharts described above or the processing carried out by the configuration of the block diagram described above. Then, the CPU 202 outputs the processing result from an output unit 206 or transmits it from a communication unit 208 as necessary via the input/output interface 210, for example, and records it onto the hard disk 205, and the like.

It should be noted that the input unit 207 is constituted of a keyboard, a mouse, a microphone, and the like. Further, the output unit 206 is constituted of an LCD (Liquid Crystal Display), a speaker, and the like.

In this specification, the processing carried out by the computer in accordance with the program does not necessarily need to be carried out in time series in the order described as the flowchart. In other words, the processing carried out by the computer in accordance with the program also includes processing that is executed in parallel or individually (e.g., parallel processing or processing by object).

Further, the program may be processed by a single computer (processor) or may be processed by a plurality of computers in a distributed manner. Furthermore, the program may be transferred to a remote computer and executed.

It should be noted that in this specification, the term "system" means a group of a plurality of constituent elements (apparatuses, modules (components), etc.), whether all of the constituent elements are accommodated in the same casing is irrelevant. Therefore, a plurality of apparatuses that are accommodated in different casings and connected via a network, and a single apparatus in which a plurality of modules are accommodated in a single casing are both referred to as system.

Embodiments of the present technology are not limited to the embodiments described above and can be variously modified without departing from the gist of the present technology.

For example, it is possible to adopt a configuration in which all or parts of the embodiments described above are combined.

For example, in the present technology, it is possible to adopt a cloud computing configuration in which one function is shared by and processed cooperatively by a plurality of apparatuses via a network.

Further, the respective steps described in the flowcharts described above can be shared and executed by a plurality of apparatuses in addition to executing them by a single apparatus.

Furthermore, in a case where a plurality of processing are included in a single step, the plurality of processing included in the single step can be shared and executed by a plurality of apparatuses in addition to executing them by a single apparatus.

It should be noted that the effects described in the present specification are mere examples and should not be limited, and effects other than those described in the present specification may also be obtained.

It should be noted that the present technology can also take the following configurations.

(1) An image processing apparatus, including
an image processing unit that divides an image area of a predetermined image into at least two areas on the basis of distance information obtained by a distance measurement sensor, and executes image processing on at least one of the two areas of the image such that image qualities of the two areas differ.

(2) The image processing apparatus according to (1), in which
the image processing unit executes, as the image processing, resolution conversion processing that converts a resolution such that resolutions of the two areas differ.

(3) The image processing apparatus according to (2), in which
the two areas include a first area and a second area, and
the image processing unit executes processing of generating two images including a first image in which a resolution of the first area is a first resolution and a second image in which a resolution of the second area is a second resolution lower than the first resolution.

(4) The image processing apparatus according to (2), in which
the two areas include a first area and a second area, and
the image processing unit executes processing of generating one image in which a resolution of the first area is a first resolution and a resolution of the second area is a second resolution lower than the first resolution.

(5) The image processing apparatus according to any one of (1) to (4), in which
the image processing unit executes, as the image processing, gradation count conversion processing that converts a gradation count such that gradation counts of the two areas differ.

(6) The image processing apparatus according to (5), in which
the two areas include a first area and a second area, and
the image processing unit executes processing of generating two images including a first image in which a gradation count of the first area is a first gradation count and a second image in which a gradation count of the second area is a second gradation count smaller than the first gradation count.

(7) The image processing apparatus according to (5), in which
the two areas include a first area and a second area, and
the image processing unit executes processing of generating one image in which a gradation count of the first area is a first gradation count and a gradation count of the second area is a second gradation count smaller than the first gradation count.

(8) The image processing apparatus according to any one of (1) to (7), in which
the image processing unit executes, as the image processing, frame rate conversion processing that converts a frame rate such that frame rates of the two areas differ.

(9) The image processing apparatus according to (8), in which
the two areas include a first area and a second area, and
the image processing unit executes processing of generating two images including a first image in which a frame rate of the first area is a first frame rate and a second image in which a frame rate of the second area is a second frame rate smaller than the first frame rate.

(10) The image processing apparatus according to any one of (1) to (9), in which
the two areas include a first area and a second area, and
the image processing unit generates frame synthesis information that associates a first image in which first image processing has been executed on the first area and a second image in which second image processing has been executed on the second area with each other, and adds the frame synthesis information to the first image or the second image.

(11) The image processing apparatus according to any one of (1) to (10), in which
the distance measurement sensor is an active-type distance measurement sensor.

(12) The image processing apparatus according to any one of (1) to (10), in which
the distance measurement sensor is a passive-type distance measurement sensor.

(13) The image processing apparatus according to any one of (1) to (10), further including:
the distance measurement sensor; and
an image pickup sensor that captures an image of a subject,
in which
the predetermined image is an image captured by the image pickup sensor.

(14) An image processing method executed by an image processing apparatus, including
dividing an image area of a predetermined image into at least two areas on the basis of distance information obtained by a distance measurement sensor, and executing image processing on at least one of the two areas of the image such that image qualities of the two areas differ.

(15) An image pickup apparatus, including:
an image pickup sensor that captures an image of a subject;
a distance measurement sensor that acquires distance information with respect to the subject; and
an image processing unit that divides an image area of an image obtained by the image pickup sensor into at least two areas on the basis of the distance information obtained by the distance measurement sensor, and executes image processing on at least one of the two areas of the image such that image qualities of the two areas differ.

REFERENCE SIGNS LIST

1 image processing system
11 image pickup apparatus
13 reception apparatus
14 display apparatus
31 control unit
32 optical system
33 light-emitting unit
34 distance measurement sensor
35 image pickup sensor
36 image processing unit
38 communication unit
39 display unit
40 operation unit
41 distance information acquisition unit
61 captured image
62 depth map
81 attention area
82 non-attention area
91 first image
92 second image
93 synthetic image
202 CPU
203 ROM
204 RAM
205 hard disk
206 output unit
207 input unit
208 communication unit
209 drive

The invention claimed is:

1. An image processing apparatus, comprising:
an image processing unit that divides an image area of a predetermined image captured by an image pickup sensor into at least two areas on a basis of a designation by a user of one of the two areas as an attention area and on a basis of distance information obtained by a distance measurement sensor, and executes image processing on at least one of the two areas of the image such that image qualities of the two areas differ, wherein the image processing unit executes, as the image processing, resolution conversion processing that converts a resolution such that resolutions of the two areas differ, wherein the two areas include a first area and a second area, and wherein the image processing unit executes processing of generating one image in which a resolution of the first area is a first resolution and a resolution of the second area is a second resolution lower than the first resolution.

2. The image processing apparatus according to claim 1, wherein the image processing unit executes processing of generating two images including a first image in which a resolution of the first area is a first resolution and a second image in which a resolution of the second area is a second resolution lower than the first resolution.

3. The image processing apparatus according to claim 1, wherein the image processing unit executes, as the image processing, gradation count conversion processing that converts a gradation count such that gradation counts of the two areas differ.

4. An image processing apparatus, comprising:

an image processing unit that divides an image area of a predetermined image captured by an image pickup sensor into at least two areas on a basis of a designation by a user of one of the two areas as an attention area and on a basis of distance information obtained by a distance measurement sensor, and executes image processing on at least one of the two areas of the image such that image qualities of the two areas differ, wherein the image processing unit executes, as the image processing, gradation count conversion processing that converts a gradation count such that gradation counts of the two areas differ, wherein the two areas include a first area and a second area, and wherein the image processing unit executes processing of generating two images including a first image in which a gradation count of the first area is a first gradation count and a second image in which a gradation count of the second area is a second gradation count smaller than the first gradation count.

5. An image processing apparatus, comprising:

an image processing unit that divides an image area of a predetermined image captured by an image pickup sensor into at least two areas on a basis of a designation by a user of one of the two areas as an attention area and on a basis of distance information obtained by a distance measurement sensor, and executes image processing on at least one of the two areas of the image such that image qualities of the two areas differ, wherein the image processing unit executes, as the image processing, gradation count conversion processing that converts a gradation count such that gradation counts of the two areas differ, wherein the two areas include a first area and a second area, and wherein the image processing unit executes processing of generating one image in which a gradation count of the first area is a first gradation count and a gradation count of the second area is a second gradation count smaller than the first gradation count.

6. The image processing apparatus according to claim 1, wherein the image processing unit executes, as the image processing, frame rate conversion processing that converts a frame rate such that frame rates of the two areas differ.

7. An image processing apparatus, comprising:

an image processing unit that divides an image area of a predetermined image captured by an image pickup sensor into at least two areas on a basis of a designation by a user of one of the two areas as an attention area and on a basis of distance information obtained by a distance measurement sensor, and executes image processing on at least one of the two areas of the image such that image qualities of the two areas differ, wherein the image processing unit executes, as the image processing, frame rate conversion processing that converts a frame rate such that frame rates of the two areas differ, wherein the two areas include a first area and a second area, and wherein the image processing unit executes processing of generating two images including a first image in which a frame rate of the first area is a first frame rate and a second image in which a frame rate of the second area is a second frame rate smaller than the first frame rate.

8. The image processing apparatus according to claim 1, wherein the image processing unit generates frame synthesis information that associates a first image in which first image processing has been executed on the first area and a second image in which second image processing has been executed on the second area with each other, and adds the frame synthesis information to the first image or the second image.

9. The image processing apparatus according to claim 1, wherein the distance measurement sensor is an active-type distance measurement sensor.

10. The image processing apparatus according to claim 1, wherein the distance measurement sensor is a passive-type distance measurement sensor.

11. The image processing apparatus according to claim 1, further comprising:

the distance measurement sensor; and an image pickup sensor that captures an image of a subject, wherein the predetermined image is an image captured by the image pickup sensor.

12. An image processing method executed by an image processing apparatus, comprising:

dividing, by an image processing unit, an image area of a predetermined image captured by an image pickup sensor into at least two areas on a basis of a designation by a user of one of the two areas as an attention area and on a basis of distance information obtained by a distance measurement sensor, and executing image processing on at least one of the two areas of the image such that image qualities of the two areas differ, wherein the image processing unit executes, as the image processing, resolution conversion processing that converts a resolution such that resolutions of the two areas differ, wherein the two areas include a first area and a second area, and wherein the image processing unit executes processing of generating one image in which a resolution of the first area is a first resolution and a resolution of the second area is a second resolution lower than the first resolution.

13. An image pickup apparatus, comprising:

an image pickup sensor that captures an image of a subject;

a distance measurement sensor that acquires distance information with respect to the subject; and an image processing unit that divides an image area of an image obtained by the image pickup sensor into at least two areas on a basis of a designation by a user of one of the two areas as an attention area and on a basis of the distance information obtained by the distance measurement sensor, and executes image processing on at least one of the two areas of the image such that image qualities of the two areas differ, wherein the image processing unit executes, as the image processing, resolution conversion processing that converts a resolution such that resolutions of the two areas differ, wherein the two areas include a first area and a second area, and wherein the image processing unit executes processing of generating one image in which a resolution of the first area is a first resolution and a resolution of the second area is a second resolution lower than the first resolution.

* * * * *